(12) United States Patent
Ilg et al.

(10) Patent No.: US 6,850,189 B2
(45) Date of Patent: Feb. 1, 2005

(54) CIRCUIT FOR THE SELECTIVE ACTIVATION OF A PLURALITY OF ANTENNAS FROM A COMMON END STAGE

(75) Inventors: Johannes Ilg, Regensberg (DE); Franz Waltl, Saal (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/364,541

(22) Filed: Feb. 11, 2003

(65) Prior Publication Data

US 2003/0151552 A1 Aug. 14, 2003

(30) Foreign Application Priority Data

Feb. 11, 2002 (DE) .......................................... 102 05 580

(51) Int. Cl.⁷ .............................. H01Q 3/02; H01Q 3/24
(52) U.S. Cl. ...................................... 342/374; 343/876
(58) Field of Search ........................ 342/374; 343/876

(56) References Cited

U.S. PATENT DOCUMENTS

| | | | | |
|---|---|---|---|---|
| 4,123,759 A | * | 10/1978 | Hines et al. | ................. 342/374 |
| 5,977,929 A | * | 11/1999 | Ryken | ......................... 343/797 |
| 6,542,119 B2 | * | 4/2003 | Howell et al. | .............. 342/374 |

* cited by examiner

Primary Examiner—Bernarr E. Gregory
Assistant Examiner—F H. Mull
(74) Attorney, Agent, or Firm—Baker Botts L.L.P.

(57) ABSTRACT

A circuit for the selective activation of a plurality of antennas (L1 to L4) from a common end stage (8) contains a first selector switch (10) at a terminal (6) of the end stage (8), the switch contacts (12, 22) of which are each connected to a switch contact (20, 26) and via an antenna (L1, L2) each to one fixed contact each of a twin selector switch (14, 24). The fixed contacts of the twin selector switch are each connected via a further antenna (L3, L4) to the other terminal (18) of the end stage and these are also connected to the other switch contacts (16, 28) of the twin selector switch.

7 Claims, 2 Drawing Sheets

CIRCUIT FOR THE SELECTIVE ACTIVATION OF A PLURALITY OF ANTENNAS FROM A COMMON END STAGE

PRIORITY

This application claims foreign priority of the German application DE 10205580.7 filed on Feb. 11, 2002.

BACKGROUND OF THE INVENTION

The invention relates to a circuit for the selective activation of a plurality of antennas from a common end stage.

In recent times an increasing number of electronically controlled access systems have been deployed in vehicles. In what are known as keyless-go systems data communication takes place for example after activation between the vehicle and a data medium held by a vehicle user, in which the authenticity of the data medium is verified and access to the vehicle is only possible in the event of positive verification. Such access systems work with a plurality of transmitter antennas, which until now were operated such that there is an end stage for each antenna, connected to the antenna by means of a switch or a relay.

SUMMARY OF THE INVENTION

The object of the invention is to reduce the costs hitherto incurred for the selective activation of a plurality of antennas.

This object can be achieved with a circuit for the selective activation of a plurality of antennas from a common end stage, comprising:
 a first selector switch at one terminal of the end stage, the fixed contact of which can be optionally connected to one of two switch contacts,
 a second selector switch with a fixed contact, which is connected via a first antenna to a first switch contact of the first selector switch, a first switch contact which is connected to the other terminal of the end stage, and a second switch contact, which is connected to the first switch contact of the first selector switch,
 a third selector switch, which can be switched simultaneously with the second selector switch, with a fixed contact which is connected via a second antenna to a second switch contact of the first selector switch, a first switch contact, which is connected to the other terminal of the end stage, and a second switch contact, which is connected to the second switch contact of the first selector switch, and a further antenna each, which is connected to the fixed contact of the second selector switch or of the third selector switch and of the other terminal of the end stage.

The circuit may further comprise a fourth selector switch inserted into the path from the first output terminal of the end stage to the fixed contact of the first selector switch, one switch contact of which is connected to the fixed contact of the first selector switch and the other switch contact of which is connected via an antenna and a capacitor parallel to the antenna to the other output terminal of the end stage. The circuit can alternatively comprise a fourth selector switch inserted into the path from the one output terminal of the end stage to the fixed contact of the first selector switch, one switch contact of which is connected to the fixed contact of the first selector switch and the other switch contact of which is connected to a further circuit, with the fixed contact of the first selector switch of the further circuit connected not to the one terminal of the end stage but to the other switch contact of the fourth selector switch. The selector switches can be in the form of relays. The second and the third selector switch can be combined in a twin relay. A capacitor can be coupled parallel to each antenna. A capacitor can be coupled at the terminals of the end stage.

The object can also be achieved by a circuit for the selective activation of a plurality of antennas from a common end stage, comprising:
 a first selector switch for selectively coupling one terminal of the end stage with one of two switch contacts,
 a second selector switch for selectively coupling a first or a second antenna with the first switch contact of the first selector switch,
 a third selector switch, which can be switched simultaneously with the second selector switch, for selectively coupling a third or fourth antenna with the second switch contact of the first selector switch.

The first antenna and the second antenna can be coupled in series between the first contact of the first switch and the other terminal of the end stage and the third antenna and the fourth antenna are coupled in series between the second contact of the first switch and the other terminal of the end stage. A fourth selector switch can be coupled between the first output terminal of the end stage and the first selector switch for coupling the output terminal with the first selector switch or with a fifth antenna and a capacitor parallel to the antenna. A fourth selector switch can be coupled between the first output terminal of the end stage and the first selector switch for coupling the output terminal with the first selector switch or with another circuit for the selective activation of a plurality of antennas from a common end stage. The selector switches can be relays. The second and the third selector switch can be combined in a twin relay. A capacitor can be coupled in parallel to each antenna. A capacitor can also be coupled at the terminals of the end stage.

The circuit according to the invention has a single end stage, by means of which one of the number of antennas at a time can be activated or connected to the end stage by expedient operation of selector switches in the circuit.

The circuit according to the invention can be used advantageously anywhere, where a plurality of antennas is to be operated selectively with a single end stage.

BRIEF DESCRIPTION OF THE DRAWINGS

The invention is described below using diagrammatic drawings as examples and with further details.

In the drawings.

DETAILED DESCRIPTION OF THE PREFERRED EMBODIMENTS

Figure 1:
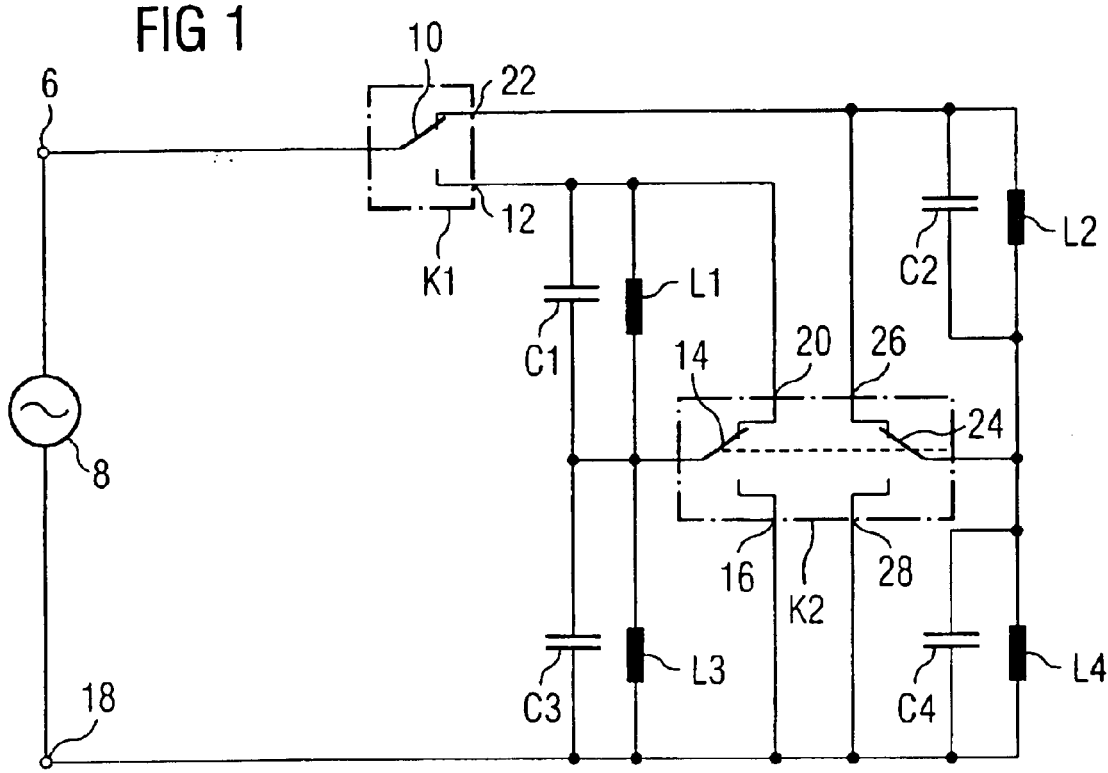
FIGS. 1 to 4 show circuit diagrams of four different embodiments of the circuits according to the invention.

According to FIG. 1 an output terminal 6 of an end stage 8, at the output of which is an alternating voltage to be transmitted, is connected to a fixed contact on a first selector switch 10. The first switch contact 12 of the selector switch 10, which is not switched or connected to the fixed contact in FIG. 1, is connected via a first antenna L1 to the fixed contact of a second selector switch 14, of which the first switch contact 16, not switched according to FIG. 1, is connected to the other output terminal 18 of the end stage 8. A third antenna L3 is connected to the fixed contact and first switch contact of the second selector switch 14. The second switch contact 20, switched in FIG. 1, of the first selector switch 14 is connected to the first switch contact 12 of the first selector switch 10.

Capacitors C1 and C3, the function of which is described in more detail below, are parallel to the antennas L1 and L3.

The second switch contact 22 of the first selector switch 10 is connected via a second antenna L2 to a fixed contact of a third selector switch 24, the second switch contact 26 of which is switched in the example shown and is connected to the second switch contact 22 of the first selector switch 10.

The first switch contact 28 of the third selector switch 24 is connected to the output terminal 18 of the end stage 8. The fixed contact of the third selector switch 24 is also connected via a fourth antenna L4 to the output terminal 18. Capacitors C2 and C4 are parallel to the antennas L2 and L4.

The selector switches 14 and 24 are advantageously combined in a twin relay K2, which has two change-over contacts, with the switch elements of the change-over contacts operated together, as shown by the dotted line.

The function of the circuit according to FIG. 1 is described below, with "not activated" describing the switch status shown in FIG. 1 and "activated" describing the opposite switch status to FIG. 1. To reduce the number of different components, the first selector switch 10 can also be represented by a twin relay K1, the second change-over contact bank of which is then not connected.

| Activated relay | Activated antenna |
| --- | --- |
| K1 not and K2 not | L4 |
| K1 yes and K2 not | L3 |
| K1 not and K2 yes | L2 |
| K1 and K2 | L1 |

This means that one of the antennas L1 to L4 can only be operated selectively from the end stage 8 by activating the selector switches or relays K1 and K2 from a control device (not shown).

The function of the capacitors C1 to C4 is as follows:

If capacitors are switched parallel to the antennas according to the formula $$f_0 = \frac{1}{2\pi \cdot \sqrt{L,C}},$$

where $f_0$ is the frequency to be emitted, L is the inductivity of the respective antenna and C is the capacity of the parallel capacitors, the relays or switch contacts must satisfy less stringent requirements due to the compensation effect or have a higher level of endurance for the same quality.

Figure 2:
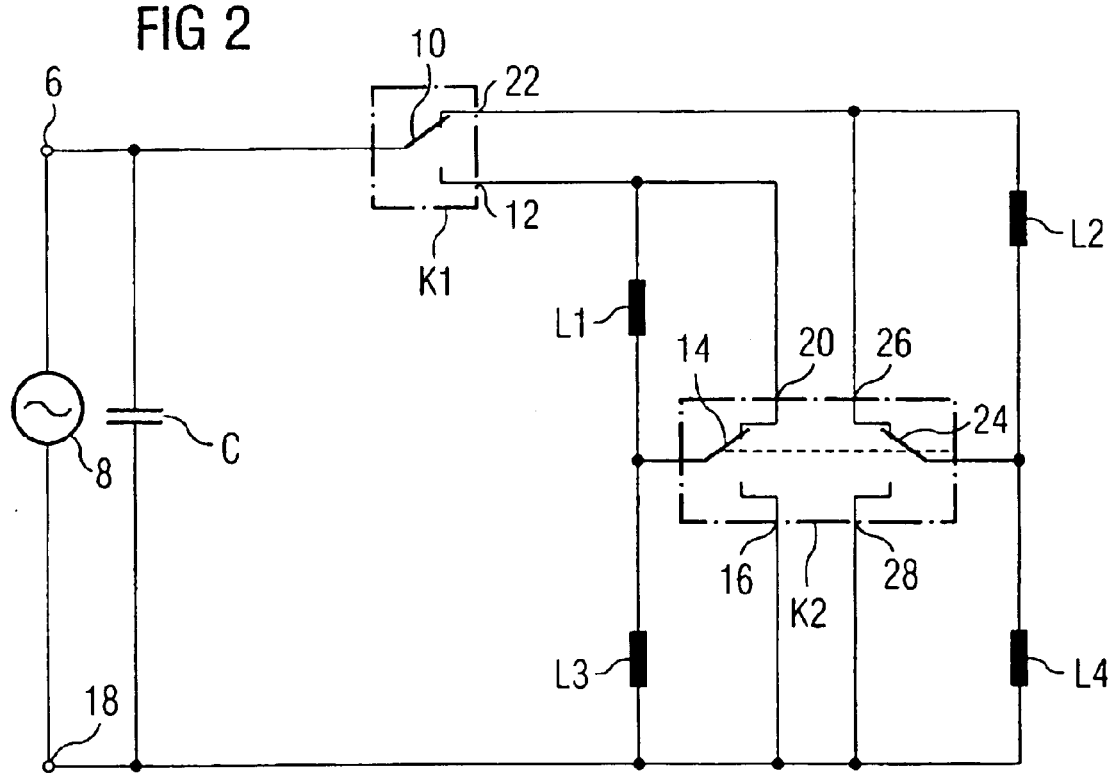

Should the assigned capacitors C1 to C4 not have adequate space for the individual antennas, the capacitors C1 to C4 can be replaced according to FIG. 2 by a common capacitor C, which is directly at the terminals 6 and 18 of the end stage 8. The capacity of the capacitor C is selected so that a good compromise is achieved in respect of the requirements for the switch contacts. Otherwise the circuit according to FIG. 2 has the same structure and the same function as the circuit according to FIG. 1.

Figure 3:
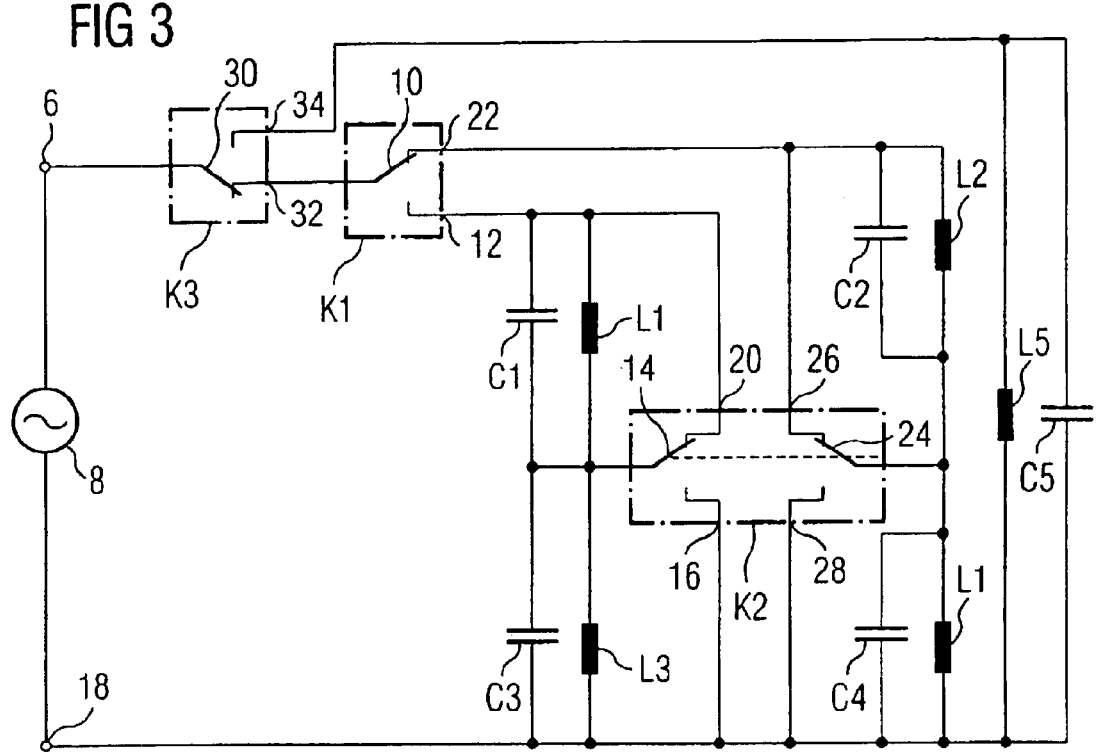

The circuit according to FIG. 3 shows an extension of the circuit according to FIG. 1 for five antennas. The difference compared with the circuit according to FIG. 1 is that a fourth selector switch 30 is inserted into the path from the one output terminal 6 of the end stage 8 to the fixed contact of the first selector switch 10, one switch contact 32 of which, shown switched, is connected to the fixed contact of the first selector switch 10 and the other switch contact 34 of which is connected via an antenna L5 and a capacitor C5 parallel to the antenna L5 to the other output terminal 18 of the end stage 8.

To reduce the number of different components, the fourth selector switch 30 can also be configured as a twin relay K3, the second change-over contact bank of which (not shown in FIG. 3) is not connected but is available for a further extension of the circuit.

The functional diagram of the circuit according to FIG. 3 is similar to that following FIG. 1, with the switch status shown in FIG. 3 designated as not activated status in each instance:

| Activated relay | Activated antenna |
| --- | --- |
| K1 not, K2 not, K3 not | L4 |
| K1 yes, K2 not, K3 not | L3 |
| K1 not, K2 yes, K3 not | L2 |
| K1 yes, K2 yes, K3 not | L1 |
| K3 yes (activation of K1 and K2 irrelevant) | L5 |

Figure 4:
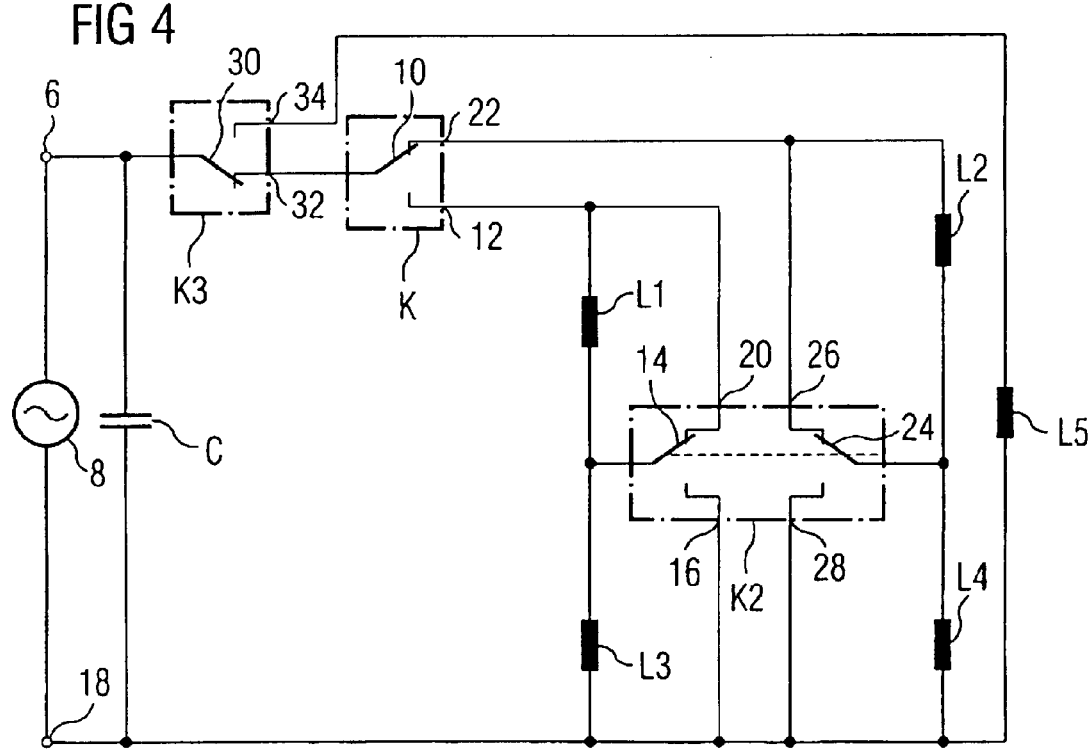

The circuit according to FIG. 4 is different from the circuit in FIG. 3 in the same way as the circuit according to FIG. 2 is different from the circuit in FIG. 1, in that not every antenna is assigned its own capacitor but a common capacitor C is used to discharge the contacts.

The selector switches shown in the FIGS. can be configured very differently; they can be represented by relays, configured as semiconductor switches, etc. What is important is that they are each activated so that selective activation of the respective antennas is achieved. Obviously the circuit can be extended to activate even more antennas.

In a variation of the circuit according to FIG. 3 or 4, a further circuit component according to FIG. 1 or 2 with the elements 10, 14, 24 and at least the antennas L1 to L4 can be linked to the switch contact 34 of the fourth selector switch 30, with the fixed contact of the first selector switch 10 of the further circuit component connected to the switch contact 34. This creates a circuit with which eight antennas can be selectively activated. Such a circuit containing two switch component modules, each of which has a selector switch (10), a twin selector switch (14, 24) and four antennas, can be extended to include further circuit modules using further upstream selector switches, so that a large number of antennas can be activated selectively.

What is claimed is:

1. Circuit for the selective activation of a plurality of antennas from a common end stage, comprising:

a first selector switch at one terminal of the end stage, the fixed contact of which can be optionally connected to one of two switch contacts, a second selector switch with a fixed contact, which is connected via a first antenna to a first switch contact of the first selector switch, a first switch contact which is connected to the other terminal of the end stage, and a second switch contact, which is connected to the first switch contact of the first selector switch, a third selector switch, which can be switched simultaneously with the second selector switch, with a fixed contact which is connected via a second antenna to a second switch contact of the first selector switch, a first switch contact, which is connected to the other terminal of the end stage, and a second switch contact, which is connected to the second switch contact of the first selector switch, and a further antenna each, which is connected to the fixed contact of the second selector switch or of the third selector switch and of the other terminal of the end stage.

2. The circuit according to claim 1, further comprising a fourth selector switch inserted into the path from the first output terminal of the end stage to the fixed contact of the first selector switch, one switch contact of which is connected to the fixed contact of the first selector switch and the other switch contact of which is connected via an antenna and a capacitor parallel to the antenna to the other output terminal of the end stage.

3. The circuit according to claim 1, further comprising a fourth selector switch inserted into the path from the one output terminal of the end stage to the fixed contact of the first selector switch, one switch contact of which is connected to the fixed contact of the first selector switch and the other switch contact of which is connected to a further circuit, with the fixed contact of the first selector switch of the further circuit connected not to the one terminal of the end stage but to the other switch contact of the fourth selector switch.

4. The circuit according to claim 1, wherein the selector switches in the form of relays.

5. The circuit according to claim 1, wherein the second and the third selector switch are combined in a twin relay.

6. The circuit according to claim 1, further comprising a capacitor parallel to each antenna.

7. The circuit according to claim 1, further comprising a capacitor at the terminals of the end stage.

* * * * *